(12) United States Patent
Amento et al.

(10) Patent No.: US 9,275,684 B2
(45) Date of Patent: Mar. 1, 2016

(54) PROVIDING SKETCH ANNOTATIONS WITH MULTIMEDIA PROGRAMS

(75) Inventors: Brian Scott Amento, Morris Plains, NJ (US); Larry Stead, Upper Montclair, NJ (US); Mukesh Nathan, Florham Park, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1161 days.

(21) Appl. No.: 12/242,493

(22) Filed: Sep. 30, 2008

(65) Prior Publication Data

US 2010/0070878 A1    Mar. 18, 2010

Related U.S. Application Data

(60) Provisional application No. 61/096,396, filed on Sep. 12, 2008.

(51) Int. Cl.
*G06F 3/048* (2013.01)
*G11B 27/34* (2006.01)
*G11B 27/034* (2006.01)
*H04N 21/81* (2011.01)

(52) U.S. Cl.
CPC .............. *G11B 27/34* (2013.01); *G11B 27/034* (2013.01); *A63F 2300/572* (2013.01); *H04N 21/8146* (2013.01)

(58) Field of Classification Search
CPC ................................................ H04N 21/8146
USPC ......................................... 715/203, 230, 751
See application file for complete search history.

(56) References Cited

U.S. PATENT DOCUMENTS

| | | | | |
|---|---|---|---|---|
| 5,600,775 | A * | 2/1997 | King et al. ..................... | 715/203 |
| 5,717,869 | A * | 2/1998 | Moran et al. .................. | 715/716 |
| 5,781,727 | A * | 7/1998 | Carleton et al. .............. | 709/205 |
| 5,832,474 | A * | 11/1998 | Lopresti et al. | |
| 6,339,431 | B1 * | 1/2002 | Ohmori et al. ................ | 345/619 |
| 6,816,904 | B1 * | 11/2004 | Ludwig et al. ................ | 709/226 |
| 2002/0059342 | A1 | 5/2002 | Gupta et al. | |
| 2003/0225641 | A1 * | 12/2003 | Gritzmacher et al. .......... | 705/34 |

(Continued)

FOREIGN PATENT DOCUMENTS

EP        1280036      *   1/2003   .............. G06F 21/00

OTHER PUBLICATIONS

Video Annotation Tools by Chaudhary et. al. Texas A&M University May 2008.*

(Continued)

*Primary Examiner* — William Bashore
*Assistant Examiner* — Nathan Shrewsbury
(74) *Attorney, Agent, or Firm* — Jackson Walker L.L.P.

(57) ABSTRACT

A method for collaborative sketch annotating of a program of multimedia content includes enabling a first user to create a sketch annotation, enabling the first user to store sketch annotation data related to the sketch annotation, and enabling a second user to access the sketch annotation. The second user may navigate the program using the sketch annotation and/or an indication of the sketch annotation. The first user may create the sketch annotation while viewing the program, for example, and the program may be paused for adding the sketch annotation to one or more paused frames. The sketch annotations may include chronological information indicative of a chronological location of the sketch annotation within the program.

30 Claims, 8 Drawing Sheets

(56) References Cited

U.S. PATENT DOCUMENTS

| | | | |
|---|---|---|---|
| 2004/0068758 A1 | 4/2004 | Daily et al. | |
| 2004/0114541 A1* | 6/2004 | Caspi et al. | 370/260 |
| 2004/0117472 A1* | 6/2004 | Masachika | 709/223 |
| 2004/0125133 A1* | 7/2004 | Pea et al. | 345/751 |
| 2004/0237033 A1* | 11/2004 | Woolf | G06F 17/242 715/211 |
| 2005/0144284 A1* | 6/2005 | Ludwig et al. | 709/226 |
| 2006/0041632 A1* | 2/2006 | Shah et al. | 709/217 |
| 2006/0167662 A1* | 7/2006 | Yu | G06Q 10/10 702/186 |
| 2006/0209044 A1 | 9/2006 | Cohen et al. | |
| 2006/0209052 A1 | 9/2006 | Cohen et al. | |
| 2006/0282856 A1 | 12/2006 | Errico et al. | |
| 2007/0250901 A1 | 10/2007 | McIntire et al. | |
| 2007/0266304 A1 | 11/2007 | Fletcher et al. | |
| 2008/0168073 A1* | 7/2008 | Siegel et al. | 707/100 |
| 2008/0195931 A1* | 8/2008 | Raghupathy | G06K 9/00402 715/230 |
| 2008/0215962 A1* | 9/2008 | Belitz | H04N 1/32128 715/232 |
| 2008/0229186 A1* | 9/2008 | Gear | G06T 19/00 715/233 |
| 2008/0288857 A1* | 11/2008 | Duncan | G06F 17/241 715/230 |
| 2009/0319884 A1* | 12/2009 | Amento | G06Q 10/10 715/230 |
| 2009/0319885 A1* | 12/2009 | Amento et al. | 715/230 |
| 2009/0327856 A1* | 12/2009 | Mouilleseaux et al. | 715/230 |
| 2010/0070878 A1* | 3/2010 | Amento | G11B 27/34 715/751 |
| 2010/0070987 A1* | 3/2010 | Amento | H04H 60/33 725/10 |
| 2010/0071000 A1* | 3/2010 | Amento | H04N 7/173 725/39 |

OTHER PUBLICATIONS eSports: Collaborative and Synchronous Video Annotation System in Grid Computing Environment by Gang Zhai et al (IEEE ISM 2005).*
Watch-and-Comment as a Paradigm toward Ubiquitous Interactive Video Editing Renan G. Cattelan ACM Oct. 2008.*

* cited by examiner

PROVIDING SKETCH ANNOTATIONS WITH MULTIMEDIA PROGRAMS

BACKGROUND

1. Field of the Disclosure

The present disclosure relates to multimedia services, and more particularly, to providing sketch annotations related to multimedia content in a social networking environment.

2. Description of the Related Art

Social networking related to multimedia programs is often conducted through means that are separate from a provider network that provides the multimedia content. For example, friends that want to discuss multimedia programs often do so over telephones, through in-person interactions, or through text-based communications (e.g., email and text messaging). Discussions of multimedia programs are often limited to verbal communications (i.e., communications that use only words).

DESCRIPTION OF THE EMBODIMENT(S)

Figure 1:
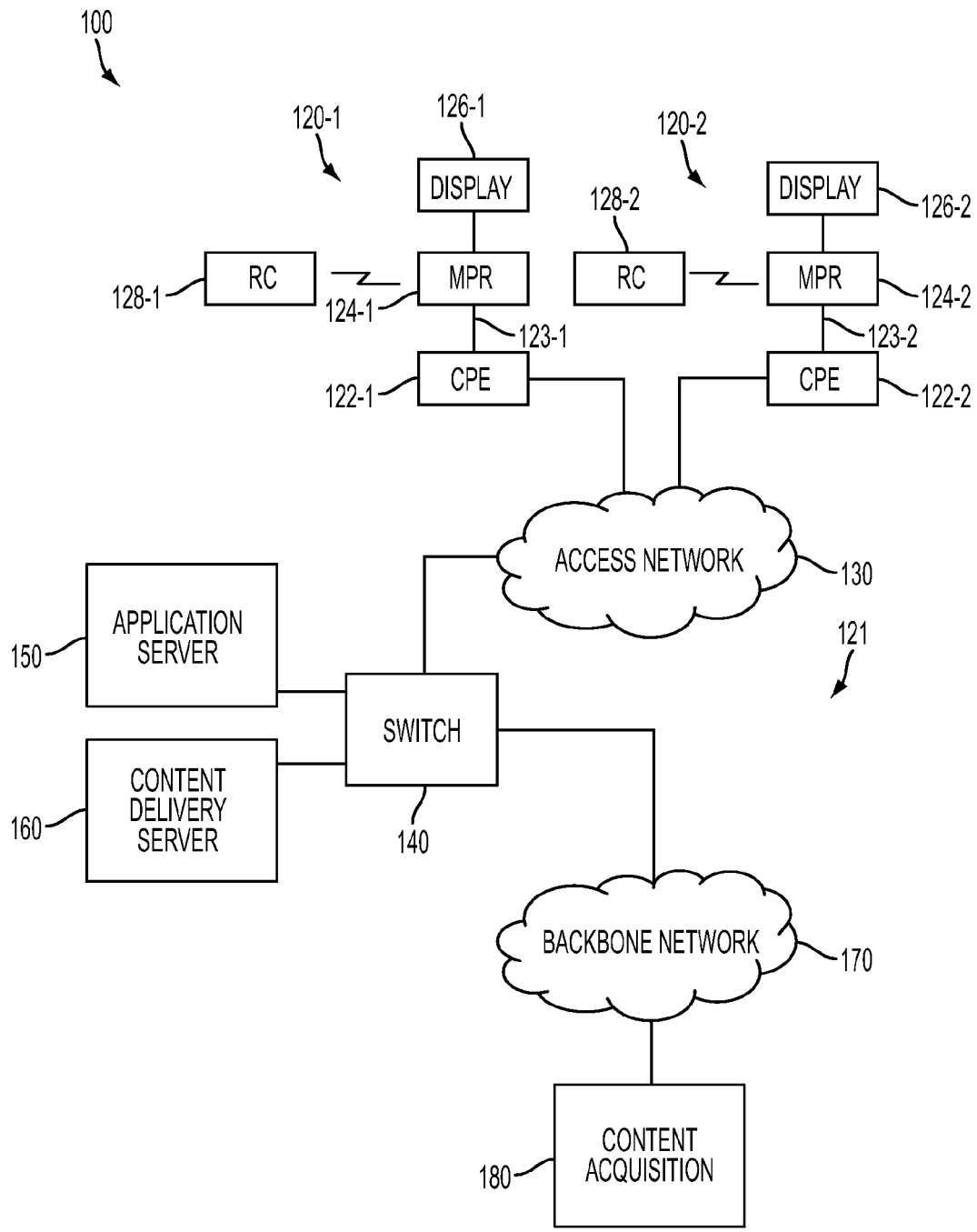
FIG. 1 is a block diagram of selected elements of a multimedia content distribution network.

In one aspect, a disclosed service allows for collaborative sketch annotating of multimedia content. A first user is enabled to create sketch annotations for a multimedia program using a first client such as a set-top box (STB) or other customer premises equipment (CPE). The sketch annotation may be hand-drawn and may be coded to distinguish it from sketch annotations of other users. Accordingly, sketch annotations may be received from a touch screen entered manually or with a stylus. In some embodiments, a personal digital assistant (PDA), mobile communication device (e.g., cellular telephone), or remote control device equipped with motion sensing equipment may be enabled to detect movement and thereby accept user input for creating sketch annotations. Data indicative of the sketch annotation is stored and a second user of a second client is enabled to view the sketch annotation while viewing the program. The sketch annotation may be associated with chronological information that indicates the chronological location of the sketch annotation within the program. The second user of the second client may view the sketch annotations asynchronously compared to viewings by other users and compared to when they are made. The sketch annotations may be viewed at any time after they are made in some embodiments.

In another aspect, a disclosed data processing system that is suitable for use in a multimedia content delivery network includes a processor that has access to tangible, computer readable storage, which may be concentrated in a single storage entity or distributed among a plurality of storage entities. The storage includes embedded and executable instructions (i.e., software) for collaborative sketch annotation of a multimedia content program. Disclosed software has instructions for generating a sketch annotation in response to a first user providing a sketch annotation request, storing data indicative of the sketch annotation, recognizing a second user as a member of a collaboration group, and providing the sketch annotation to the second user. The sketch annotation may be generated while the first user is viewing the program, and the first user may provide input to pause the program while the sketch annotation is created. The sketch annotation may be associated with or include chronological information indicative of its location (i.e., temporal location) within the program. A graphical element such as a timeline may be presented to users of a collaboration group and may include indications (e.g., sketch annotation icons) of where sketch annotations from multiple users appear throughout a program. Each indication of a sketch annotation and each sketch annotation may be coded to allow users to determine which user created it. For example, each sketch annotation and/or indication of sketch annotation may be color-coded or labeled to attribute it to its author. Sketch annotations may be created while one or more users are viewing a program, and further, different users may be viewing different portions of the program at a given time. Sketch annotations and indications of sketch annotations, in some embodiments, are dynamically updated for each user within a collaboration group regardless of which portion of the program is being viewed by members of the collaboration group at a given time. Input used to create sketch annotations may come from hardware devices including but not limited to remote control devices with motion detection equipment (e.g., accelerometers), touch screen interfaces on mobile devices, and displays with sensors for receiving on-screen input (e.g., laser input) from remote control devices.

In still another aspect, a disclosed method supports users within a sketch annotation group providing and viewing collaborative sketch annotations associated with a multimedia program. The method includes a first user of a sketch annotation group initiating entry of a contemporaneously generated, free-form, sketch annotation. Sketch annotation data indicative of the sketch annotation is stored and the sketch annotation data is associated with a selected chronological location within the program. If a second user of the sketch annotation group requests the program, the second user is provided access to the sketch annotation in conjunction with the program. The second user may use sketch annotation data to navigate the multimedia content based on the sketch annotation and view information indicative of the sketch annotation while viewing the selected chronological location. The sketch annotation may be superimposed on one or more images of the program that were displayed to the user when the user provided the sketch annotations. Each sketch annotation may be coded (e.g., color-coded) to attribute it to its author.

In still another aspect, a disclosed collaboration sketch annotation method includes enabling a plurality of users to provide sketch annotations that are associated with a program of multimedia content, storing sketch annotation data indicative of the sketch annotations, and enabling one or more of the plurality of users to access the stored sketch annotation data and display the sketch annotations while the program is playing. A first user may define the plurality of users (e.g., a collaboration group) that are provided access to the stored sketch annotation data. The plurality of users may navigate the program using indications of the sketch annotations. For example, a user may select an indication of a sketch annotation (e.g., a sketch annotation icon presented on a graphical timeline) made during the beginning of the program and consequently may be presented with corresponding portions of the beginning of the program.

The sketch annotation may include an image indicative of the content or frame that was displayed when the user asserted the annotation button or otherwise created the sketch annotation. The sketch annotation might include information indicative of the sketch annotation's author and other annotation content including text, an audio segment, an image, or a video segment selected by the viewer or other author of the sketch annotation. The sketch annotations may be chronologically ordered and might include chronological information indicative of a chronological location of the sketch annotation within the program.

In the following description, details are set forth by way of example to facilitate discussion of the disclosed subject matter. It should be apparent to a person of ordinary skill in the field, however, that the disclosed embodiments are exemplary and not exhaustive of all possible embodiments. Throughout this disclosure, a hyphenated form of a reference numeral refers to a specific instance of an element and the un-hyphenated form of the reference numeral refers to the element generically or collectively. Thus, for example, widget 12-1 refers to an instance of a widget class, which may be referred to collectively as widgets 12 and any one of which may be referred to generically as a widget 12.

Turning now to the drawings, FIG. 1 is a block diagram illustrating selected elements of an embodiment of a multimedia content delivery network (MCDN 100). The depicted embodiment of MCDN 100 includes functionality to facilitate collaborative sketch annotating of a multimedia content stream and possibly enhanced navigation of sketch annotated streams based on the sketch annotations themselves. Although multimedia content is not limited to television, video-on-demand, or pay-per-view programs, the depicted embodiments of MCDN 100 and its capabilities are described herein with primary reference to these types of multimedia content, which are interchangeably referred to herein as multimedia content program(s), multimedia programs or, simply, programs.

The elements of MCDN 100 illustrated in FIG. 1 emphasize the network's functionality for delivering multimedia content to one or more users (e.g., subscribers). As depicted in FIG. 1, MCDN 100 includes one or more clients 120, where each client may represent a different user subscriber, and a service provider 121 that encompasses resources to acquire, process, and deliver programs to clients 120. Clients 120 and service provider 121 are demarcated by an access network 130 to which clients 120 and service provider 121 are connected. In some embodiments, access network 130 is an Internet protocol (IP) network, while in other embodiments, access network 130 may be implemented as a conventional coaxial-based network. In IP implementations of access network 130, access network 130 may employ a physical layer of unshielded twisted pair cables, fiber optic cables, or both. As an example, MCDN 100 may employ digital subscriber line (DSL) compliant twisted pair connections between clients 120 and a node (not depicted) in access network 130 while fiber cable or other broadband cable connects service provider resources to a node in access network 130. In other embodiments, the broadband cable may extend all the way to clients 120.

The clients 120 depicted in FIG. 1 include a network appliance identified as CPE 122 that connects to access network 130 and to a multimedia processing resource (MPR) 124. CPE 122 may supply routing, firewall, or other services for clients 120. CPE 122 may include elements of a broadband modem such as an asynchronous DSL (ADSL) modem as well as elements of a local area network (LAN) access point that supports a LAN 123 to which MPR 124 connects. LAN 123 may, in some embodiments, represent an Ethernet compliant LAN, also sometimes referred to as an IEEE 802.11 LAN. Clients 120 as depicted in FIG. 1 further include a display device or, more simply, a display 126. A remote control device 128 of client 120 is operable to communicate wirelessly to MPR 124 using infrared (IR) or radio frequency signals as is well known. MPRs 124 may receive input via buttons (not depicted) located on side panels of MPRs 124. MPR 124 may be implemented as a stand-alone STB suitable for use in a co-axial or IP-based multimedia content delivery network. In other embodiments, MPR 124 may be integrated with display 126, CPE 122, or both.

Figure 2:
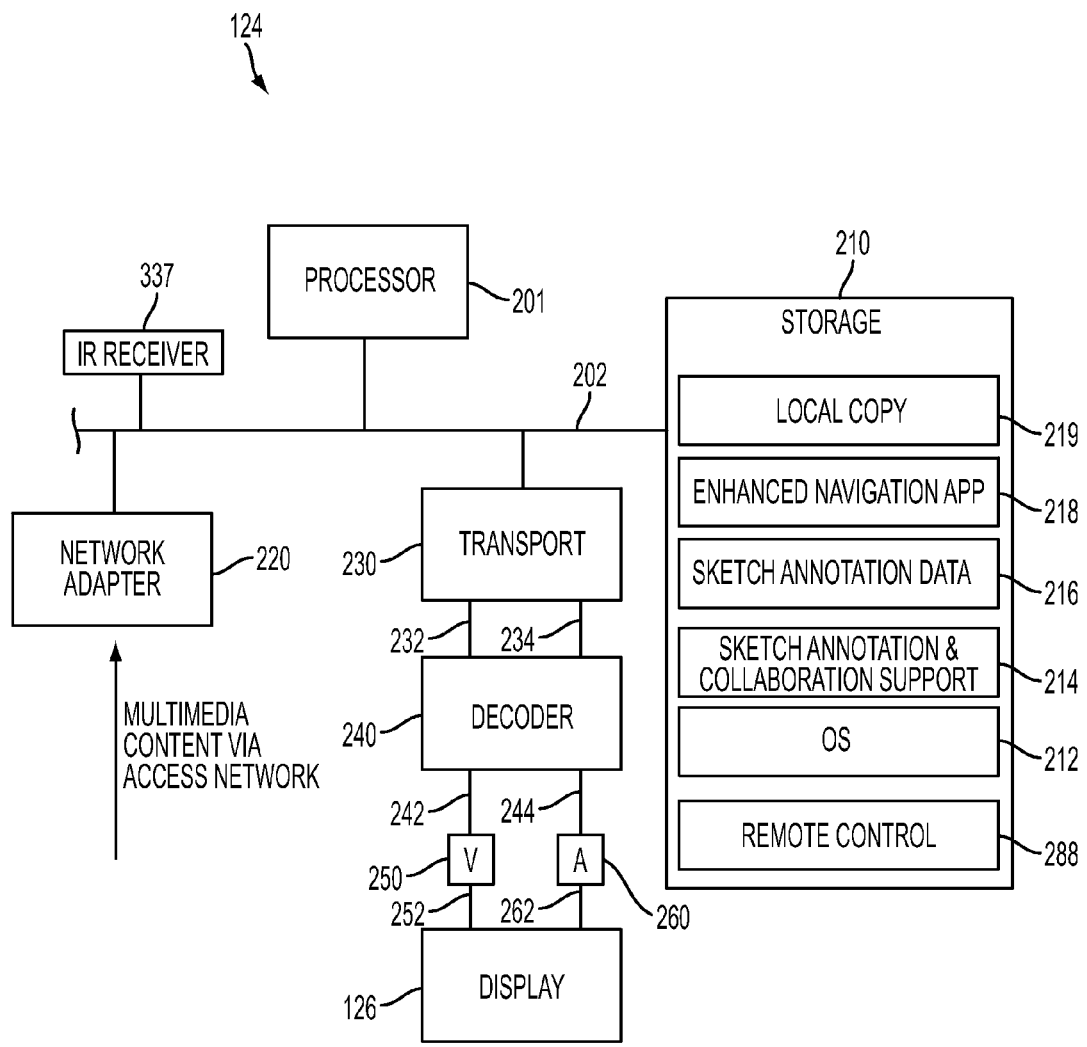
FIG. 2 is a block diagram of selected elements of an embodiment of a multimedia processing resource suitable for supporting a collaborative sketch annotation application.

Referring to FIG. 2, a block diagram illustrating selected elements of MPR 124 is presented. In the depicted embodiment, MPR 124 includes a processor 201 coupled to storage media collectively identified as storage 210 via a shared bus 202. Storage 210 encompasses persistent and volatile media, fixed and removable media, and magnetic and semiconductor media. Storage 210 is operable to store instructions, data, or both. Storage 210 as shown includes multiple sets or sequences of instructions, namely, an operating system 212, sketch annotation data 216, an application program identified as sketch annotation and collaboration support 214, and an application program identified as enhanced navigation application 218.

Operating system 212 may be a Unix® or Unix-like operating system, a Windows® family operating system, or another suitable operating system. Sketch annotation and collaboration support 214, as suggested by its name, may operate in conjunction with a sketch annotation application, which may be hosted on an application server or content delivery server of service provider 121, to facilitate collaborative sketch annotation of a program of multimedia content. Enhanced navigation application 218 may include instructions to implement sketch-annotation-based navigation of sketch annotated programs and may further include instructions to support criteria based identification of desired locations within a sketch annotated program. IR receiver 337 receives input from a remote control device (e.g., remote control device 128-1 from FIG. 1). In some embodiments, IR receiver 337 receives input from a remote control device with a touch screen that accepts input regarding the location, shape, and scale of a sketch annotation. The remote control device may be a smart phone, a laptop computer, or other electronic device. Although the embodiment of IR receiver 337 in FIG. 2 uses infrared signals, radio frequency communication and other protocols and technologies may be used to receive user input indicative of the shape, scale and location of a sketch annotation as specified by a sketch annotation author. A remote control device in communication with IR receiver 337, in some embodiments, detects motion of a user's hand indicative of the shape that the user wants for the sketch annotation. Remote control application 288, as shown in FIG. 2, processes user input received by IR receiver 337 and generates sketch annotation data used to form and display sketch annotations processed by MPR 124 and possibly other multimedia processing resources (e.g., other STBs).

The implementation of MPR 124 depicted in FIG. 2 includes a data structure identified as sketch annotation data 216 and a data structure identified as local copy 219, which represents a copy of the program of multimedia content. Sketch annotation data 216 includes data that represents or is otherwise indicative of sketch annotations created using the collaborative sketch annotation application 330 (FIG. 3) and sketch annotation and collaboration support 214 described herein. In this embodiment, sketch annotation data 216 is maintained as a data structure that is separate and distinct from the program to which the sketch annotation data corresponds. In this implementation, sketch annotation data 216 may be freely exchanged among users within a defined group independent of the underlying program. Each user may then download or otherwise acquire a resident copy of a program, an example of which is illustrated in FIG. 2 as local copy 219. Thereafter, the sketch annotation may be transferred or accessed as needed to reflect additions or other modifications to the sketch annotation data 216.

MPR 124, as depicted in FIG. 2, further includes a network adapter 220 that interfaces MPR 124 to LAN 123. In some embodiments, MPR 124 receives multimedia content through LAN 123. In embodiments suitable for use in IP based content delivery networks, MPR 124, as depicted in FIG. 2, may include a transport unit 230 that assembles the payloads from a sequence or set of network packets into a stream of multimedia content that includes sketch annotations. In coaxial based access networks, content may be delivered as a stream that is not packet based and it may not be necessary in these embodiments to include transport unit 230. In a co-axial implementation, however, clients 120 may require tuning resources (not explicitly depicted in FIG. 1) to "parse" desired content from other content that is delivered over the coaxial medium simultaneously and these tuners may be provided in MPRs 124. The stream of multimedia content received by transport unit 230 may include audio information and video information and transport unit 230 may parse or segregate the two to generate a video stream 232 and an audio stream 234 as shown.

Video and audio streams 232 and 234, as output from transport unit 230, may include audio or video information that is compressed, encrypted, or both. A decoder unit 240 is shown as receiving video and audio streams 232 and 234 and generating native format video and audio streams 242 and 244. Decoder 240 may employ any of various widely distributed video decoding algorithms including any of the Motion Pictures Expert Group (MPEG) standards, Windows Media Video (WMV) standards including WMV 9, which has been standardized as Video Codec-1 (VC-1) by the Society of Motion Picture and Television Engineers. Similarly decoder 240 may employ any of various audio decoding algorithms including Dolby® Digital, Digital Theatre System (DTS) Coherent Acoustics, and Windows Media Audio (WMA).

The native format video and audio streams 242 and 244 as shown in FIG. 2 may be processed by encoders/digital-to-analog converters (encoders/DACs) 250 and 260 respectively to produce analog video and audio signals 252 and 262 in a format compliant with display 126, which itself may not be a part of MPR 124. Display 126 may comply with a National Television Systems Committee (NTSC), Phase Alternating Line (PAL) or any other suitable television standard.

Returning now to FIG. 1, the selected elements representing service provider 121 include content acquisition resources 180 connected to a switch 140 via a backbone network 170. An application server 150 and a content delivery server 160 are also shown connected to switch 140. Switch 140 may provide firewall and routing functions to demarcate access network 130 from the resources of service provider 121. Switch 140 may be housed in a central office or other facility of service provider 121. In embodiments that employ DSL compliant connections, switch 140 may include elements of a DSL Access Multiplexer (DSLAM) that multiplexes many subscriber DSLs to backbone network 170. Backbone network 170 represents a private network including, as an example, a fiber based network to accommodate high data transfer rates. Content acquisition resources 180 as depicted in FIG. 1 encompass the acquisition of various types of content including broadcast content, other "live" content including national content feeds, and video-on-demand content.

Acquired content is provided to a content delivery server 160 via backbone network 170 and switch 140. Content may be delivered from content delivery server 160 to clients 120 via switch 140 and access network 130. Content may be compressed, encrypted, modulated, demodulated, and otherwise encoded or processed at content acquisition resources 180, content delivery server 160, or both. Although FIG. 1 depicts a single element encompassing acquisition of all content, different types of content may be acquired via different types of acquisition resources. Similarly, although FIG. 1 depicts a single content delivery server 160, different types of content may be delivered by different servers. Moreover, embodiments of MCDN network 100 may include content acquisition resources in regional offices that are connected to switch 140.

Although the service provider 121 is depicted in FIG. 1 as having a single switch 140 to which content acquisition resources 180, content delivery server 160, and application server 150 are connected, other embodiments may employ different switches for each of these functional components and may include additional functional components not depicted in FIG. 1 including, for example, operational subsystem support (OSS) resources.

FIG. 1 illustrates application server 150 connected to switch 140. As suggested by its name, application server 150 may host or otherwise implement one or more applications for MCDN 100. Applications provided by application server 150 may be downloaded and hosted on other network resources including, for example, content delivery server 160, switch 140, CPE 122, and/or MPR 124.

Figure 3:
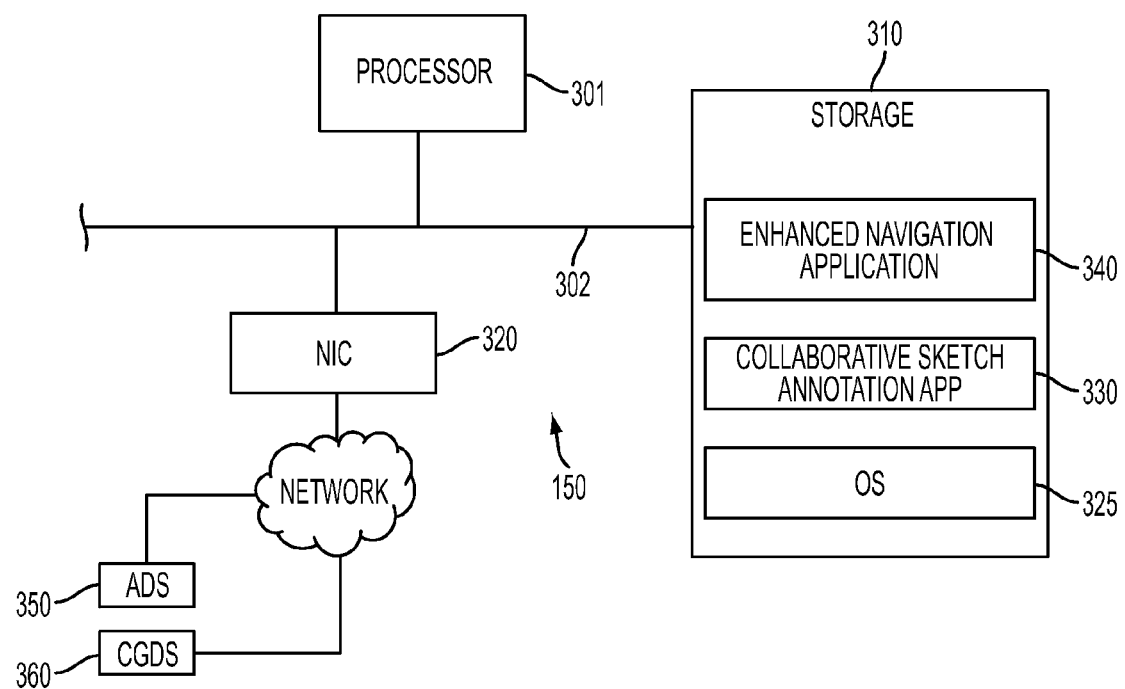
FIG. 3 is a block diagram of selected elements of an embodiment of a server suitable for hosting a collaborative sketch annotation application.

Referring to FIG. 3, a block diagram depicts selected elements of an embodiment of application server 150 including support for collaborative sketch annotation as described herein. In the depicted embodiment, application server 150 includes at least one processor 301 that is operable to access storage 310 via a shared bus 302. A network interface card (NIC) 320 connects to the shared bus 302 and supports communication between processor 310 and network connected resources.

In the depicted embodiment, storage 310 of application server 150 includes instructions that define an operating system 325, a collaborative sketch annotation application 330, and an enhanced navigation application 340. As depicted in FIG. 3, application server 150 has networked access to remote data structures including an annotation data structure 350 and a collaboration group data structure 360 that may be used in conjunction with collaborative sketch annotation application 330. In other embodiments, the data represented by data structures 350 and/or 360 may be included within storage 310. Collaborative sketch annotation application 330 is enabled to process user input data generated from a sketch annotation author that specifies the shape, size, and location of the sketch annotation relative to elements in a frame or frames of a multimedia program.

Enabling the first user to create the sketch annotation may include enabling the first user to create the sketch annotation "on-the-fly," i.e., while the first user is viewing the program. Creating a sketch annotation may, for example, be achieved by asserting an annotation button on a remote control device. The sketch annotation may then be created by the user providing user input (e.g., motion input) to a remote control device. If the remote control device contains accelerometers for example, embodied remote control devices may process data from the accelerometers to detect the shape, location, and size of an author's desired sketch annotation. A multimedia processing resource (e.g., an STB) may then receive data detected by the remote control device and process it to locate, scale and overlay the sketch annotation onto one or more frames of a program of multimedia content. User input that determines the shape, location, and size of sketch annotations may be received over a multitude of devices including mobile communication devices with touch screens, remote control devices that detect motion through accelerometers, input from a mouse, input from a laser pointer, and the like.

The sketch annotation may include sketch annotation content and chronological information. The sketch annotation content may include an image indicative of the content displayed when the user asserted the sketch annotation button. For example, the sketch annotation content may include a "screen shot" or an image of the frame that was being displayed when the user asserted the sketch annotation button. The sketch annotation content, in addition to other free-form content, may also include hand-drawn text, an audio segment, a different image, and a video segment selected by the viewer or author of the sketch annotation. The chronological information of a sketch annotation may include information indicative of a chronological location within the program of the sketch annotation. In some embodiments, the sketch annotations are chronologically ordered on a timeline overlayed on the program or otherwise displayed with the program.

Disclosed embodiments enable users to store data indicative of the sketch annotation. The user may be enabled to store the sketch annotation as a data structure that is apart and distinct from the multimedia content to which the sketch annotation data pertains. The user may be enabled to store the sketch annotation locally, e.g., in storage 210 of MPR 124 or in a networked storage resource including, as an example, storage 310 of application server 150.

Sketch annotation authors may create sketch annotations for viewing by a collaboration group that includes the author (e.g., a collaboration group member) and further users (e.g., other collaboration group members). When any collaboration group member requests the program for viewing, a sketch annotation application (e.g., collaborative sketch annotation application 330 from FIG. 3) may inform the user that he or she has been included in the sketch annotation author's collaboration group. The application may then prompt the user to determine if he or she consents to inclusion in the collaboration group. If the user consents to inclusion in the collaboration group, the application (e.g., collaborative sketch annotation application 330 from FIG. 3) may then make the sketch annotation data accessible to the user.

An embodied collaborative sketch annotation service may support enhanced user-navigation of a program by advancing a user to a chronological location within the program that satisfies certain sketch annotation criteria. For example, a user may be interested in finding or otherwise navigating to a location within the program where his girlfriend left sketch annotations. Alternatively, the user may seek a portion of the program with a high density of sketch annotations. To find any such locations, the user may specify a sketch annotation density criteria of N sketch annotations/minute. In this case, a sketch annotation application (e.g., collaborative sketch annotation application 330 in FIG. 3) may search sketch annotation data and determine, from chronological information associated with each sketch annotation or by other techniques, one or more locations in the program where there are N or more sketch annotations within a 60 second window. In some embodiments, the collaborative sketch annotation application then displays the program, if the program is not already being displayed, and advances the program to one of the locations identified as satisfying the specified criteria. In some instances, the application may advance the user to the first encountered location satisfying the criteria while, in other instances, the application may advance the user to the location that has the greatest sketch annotation density or to another location that satisfies the criteria.

Figure 4:
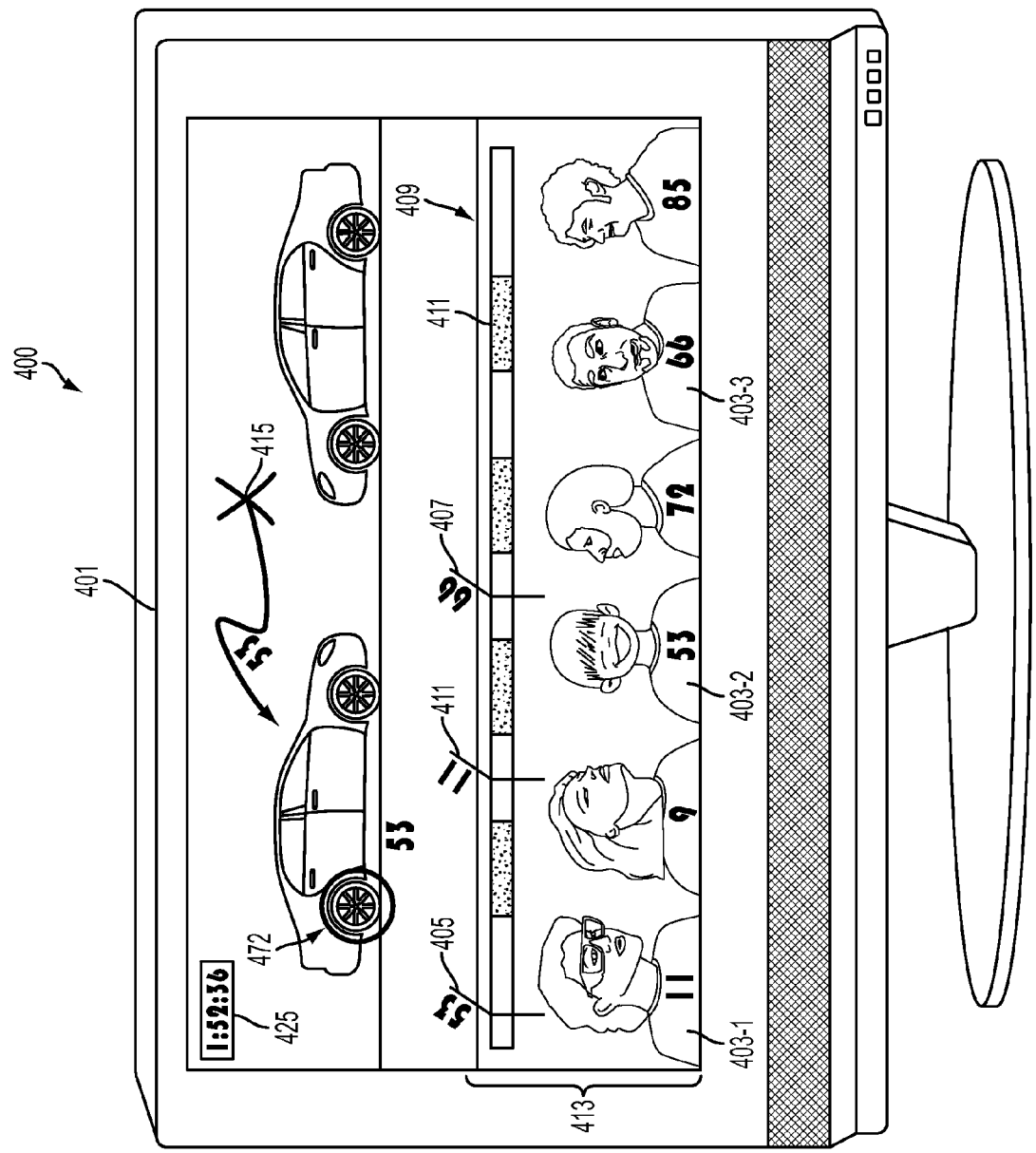
FIG. 4 depicts a display with an embodiment of a graphical user interface for supporting collaborative sketch annotations.

FIG. 4 depicts an exemplary display 401 for displaying a program of multimedia content and sketch annotations in accordance with disclosed embodiments. Avatars 403 correspond to members of collaboration group 413. Member 403-1 "wears" a number 11 for identification purposes for the benefit of other group members. Similarly, member 403-2 wears a number 53 and group member 403-3 wears a number 66. Sketch annotation 472 encircles a tire of the left-most car on the display. In some embodiments, the sketch annotation 472 may automatically "follow" the car and remain encircling the tire during motion of the display. As shown, sketch annotation 472 includes an indicator (i.e., text "53") that identifies the sketch annotation as having been created by group member 403-2. Display 401 also includes sketch annotation 415, which as shown, is a hand-drawn "X" and curved arrow that may be contemporaneously generated in a free form manner while a user is viewing the program. Sketch annotation 415 also includes an identifier (i.e., text "53") that indicates group member 403-2 is the author of the sketch annotation. In some embodiments, the image shown on display 401 is automatically paused upon the sketch annotation author requesting to add a sketch annotation. Sketch annotation 415 may be configured by the author (i.e., group member 403-2) to show for a predetermined time on display 401 or other user display or may automatically disappear upon a signification change (e.g., a scene change) of the program.

As shown in FIG. 4, display 401 presents timeline 409 that provides a user with chronological information for the program and also provides indications of sketch annotations. For example, indication (of sketch annotation) 405 is shown on the left part of timeline 409. This positioning of indication 405 suggests that the corresponding sketch annotation is associated with a frame or frames from the beginning of the program. In addition, the text "53" is part of indication 405 to inform a viewer that the author of the sketch annotation is group member 403-2, which is associated with the number "53" as indicated by the text on the avatar associated with member 403-2. Similarly, indication (of sketch annotation) 411 is associated with member 403-1 due to it showing the number "11" and indication 407 is associated with member 403-3 due to it showing the number "66." The shaded portion 411 of timeline 409 indicates a portion of the program that is occupied by commercials. In some embodiments, sketch annotations are added to commercials. Timestamp 425 informs a viewer that the frame shown on display 401 occurs one hour, fifty-two minutes, and thirty-six seconds into the program. Such information, although not depicted, may be included with indications of sketch annotations shown on a timeline (e.g., timeline 409).

Figure 5:
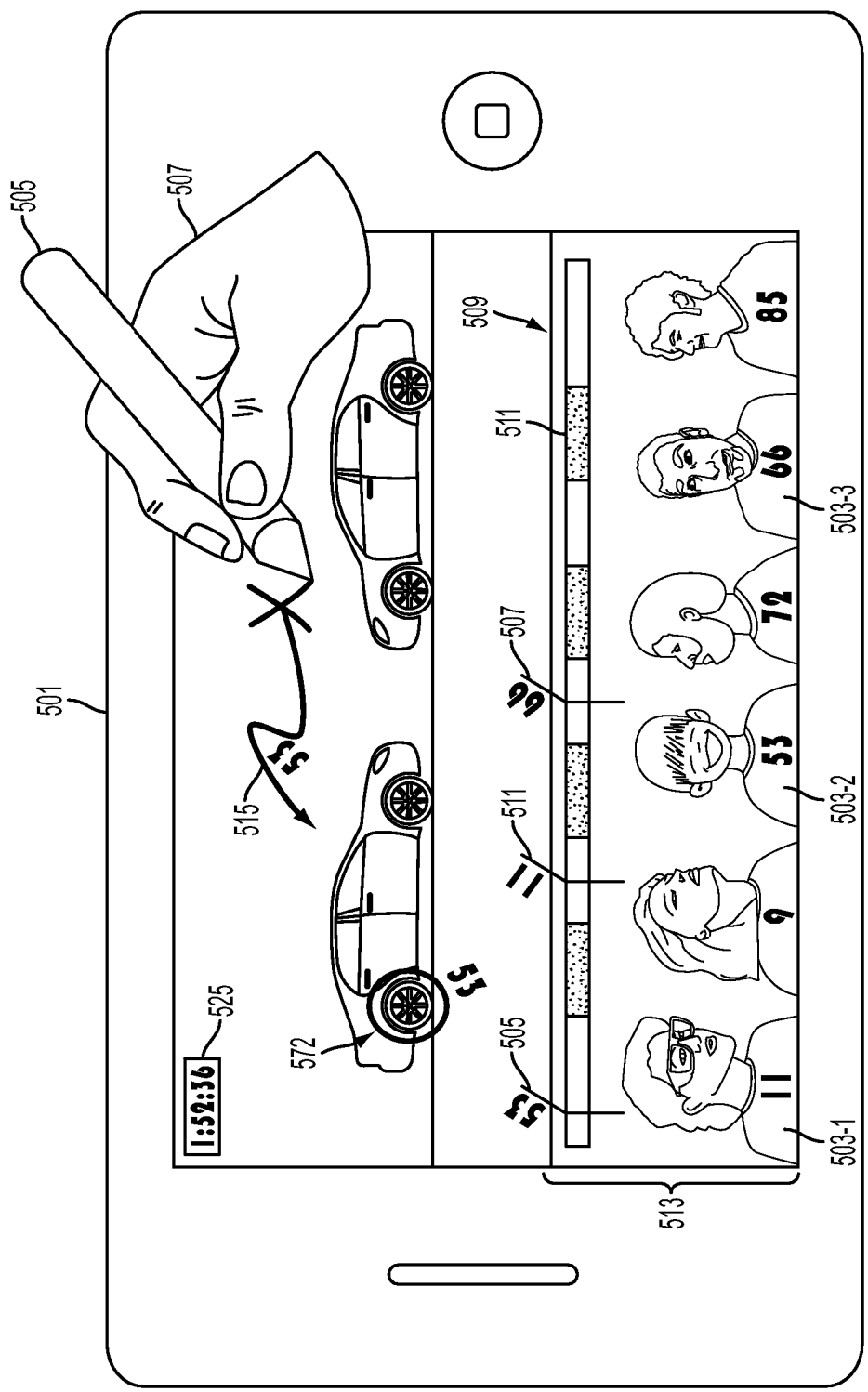
FIG. 5 depicts an embodiment of a mobile communication device for accepting user inputs to create sketch annotations.

FIG. 5 depicts a sketch annotation author's hand 507 manipulating a stylus 505 on a touch screen on mobile communication device 501. Mobile communication device 501 may be a smart phone (e.g., an Iphone), a PDA, a remote control device, or similar device for receiving user input to create sketch annotations. The display on communication device 501 includes the same frames as the program shown on display 401 (FIG. 4). The frames may be transmitted locally or through a cellular network, for example, to the mobile communication device in response to a user requesting to create a sketch annotation. Alternatively, the program may stream continuously to the mobile communication device 501 substantially simultaneously with it streaming to display 401. As shown, the stylus 505 is used to create sketch annotation 515 that then appears as sketch annotation 415 on display 401 (FIG. 4) contemporaneously with its creation or upon approval of its author to transmit it for sending to display 401 or a CPE communicatively coupled to display 401. As shown in FIG. 5, group 513 corresponds to collaboration group 413 (FIG. 4), avatar 503-1 corresponds to member 403-1, avatar 503-2 corresponds to member 403-2, sketch annotation 515 corresponds to sketch annotation 415, avatar 503-3 corresponds to member 403-3, sketch annotation 572 corresponds to sketch annotation 472, and so on.

Figure 6:
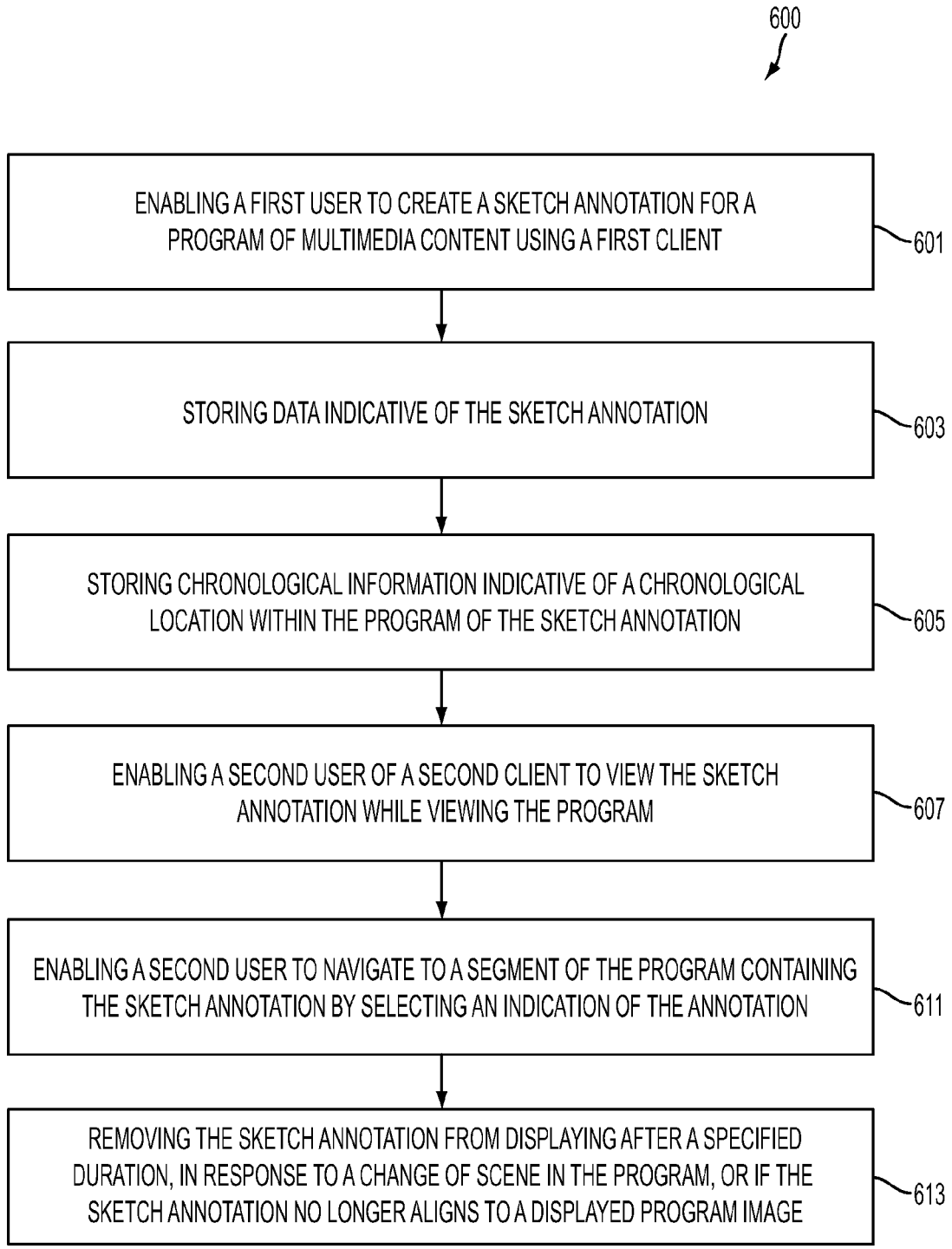
FIG. 6 is a flow diagram of selected elements of a service that enables collaborative sketch annotating of multimedia content.

FIG. 6 depicts selected elements of a collaborative annotation service 600. Service 600 may be performed, at least in part, by collaborative sketch annotation application 330. Using service 600, one or more users are enabled to provide sketch annotations to multimedia programs to promote social networking. A first user is enabled (block 601) to create a sketch annotation for a program of multimedia content using a first client. The first user may be enabled to create the sketch annotation in response to a sketch annotation request. In conjunction, the first user may be provided an opportunity to define a collaboration group by transmitting a collaboration group request that includes information that identifies or otherwise indicates one or more other users to include with the collaboration group. Collaboration group members might be identified or indicated by, for example, their names, email addresses, street addresses, phone numbers, user identifications, personal identification numbers, pseudonyms, aliases, user names, and so forth. Sketch annotations associated with a particular program may be incorporated into a single sketch annotation data structure that represents all sketch annotations (and possibly non-sketch annotations) created by any of the users in the collaboration group. In these embodiments, any of the group members may then access the sketch annotation data and interact with it. In other embodiments, the sketch annotation data may include two or more sketch annotation data structures. For example, the sketch annotation data may include separate data structures for each group member. Whether sketch annotation data is contained in a signal data structure or not, a user who accesses the sketch annotation data may have the ability to identify the users whose sketch annotations are of interest.

The sketch annotation may be a hand-drawn sketch annotation created with the aid of a smart phone, a touch screen and stylus, a remote control device emitting an IR or laser signal that is detected, a remote control device enabled with accelerometers or other motion detecting equipment, and the like. Data indicative of the sketch annotation is stored (block 603). The data indicative of the sketch annotation may be stored on a storage resource that is local to the first user or stored on a networked resource that is or may be accessible to multiple users. In addition, chronological information indicative of a chronological location of the sketch annotation within the program is stored (block 605). A second user is enabled (block 607) to view the sketch annotation while viewing the program using a second client. The second user is enabled to navigate (block 611) to a segment of the program containing the sketch annotation by selecting an indication of the sketch annotation. In some cases, indications of sketch annotations appear on a graphical timeline presented on a graphical display. The location of the sketch annotations on the graphical timeline indicate where, time-wise, the sketch annotations appear in a multimedia program. Embodied systems, methods, and services may enable users to navigate to a segment of the program containing the sketch annotation by selecting the indication of the annotation. In the embodied collaborative annotation service 600, the sketch annotation is removed (block 613) from displaying after a specified duration, in response to a change in scene in the program, or if the sketch annotation no longer aligns to a displayed program image.

Figure 7:
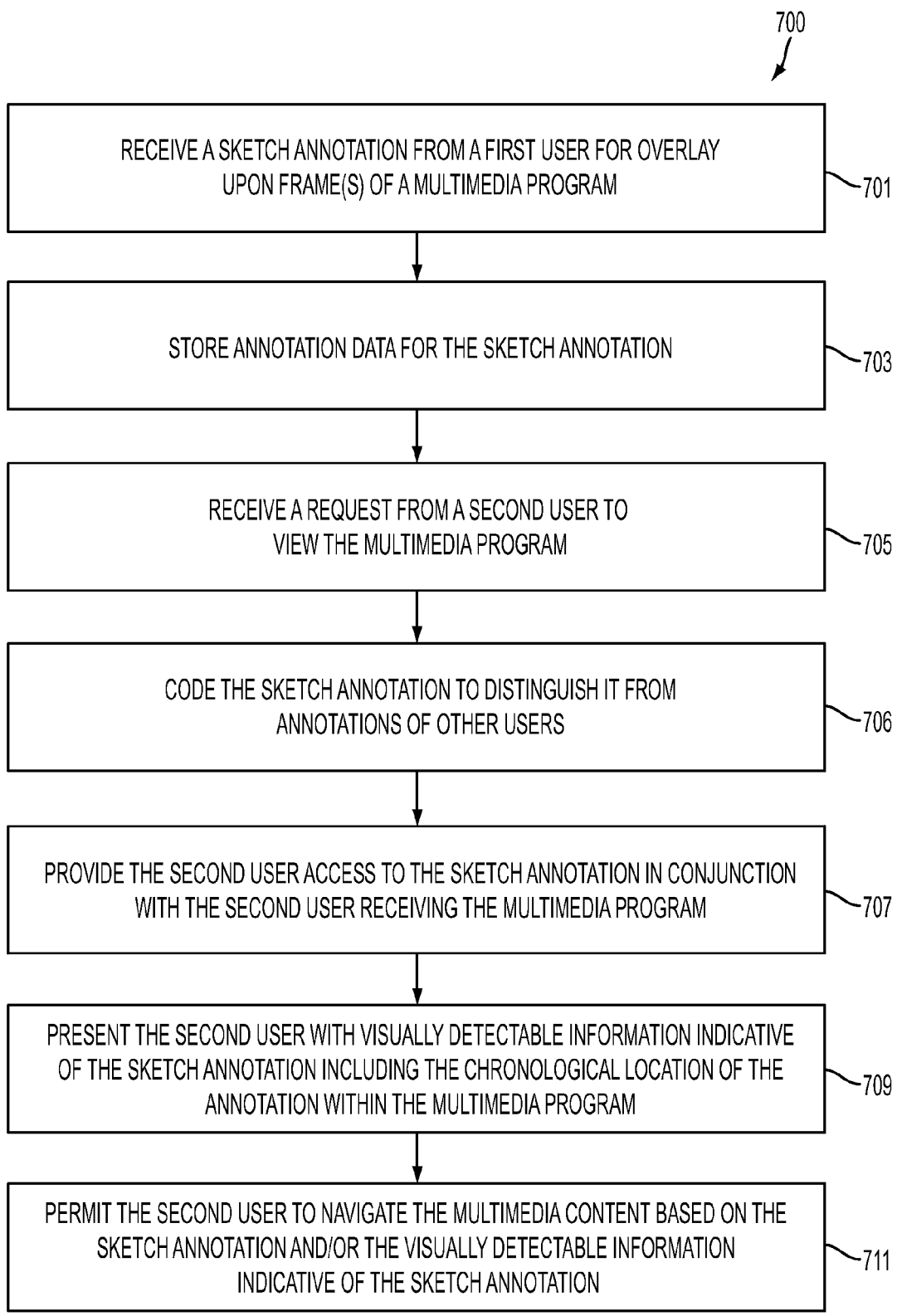
FIG. 7 is a flow diagram of selected elements of an embodiment of a method that supports collaborative sketch annotations for a program of multimedia content.

FIG. 7 illustrates collaborative sketch annotation method 700 for promoting social networking by allowing users to share sketch annotations that are attached to, associated with, or presented as an overlay upon multimedia programs. Collaborative annotation method 700 may be performed or practiced by collaborative sketch annotation application 330 (FIG. 3), another application hosted by application server 150 or another networked resource (not depicted) of MCDN 100. The depicted embodiment of collaborative annotation method 700 includes receiving (block 701) a sketch annotation from a first user for overlay upon one or more frames of a multimedia program. The embodiment further includes storing (block 703) annotation data for the sketch annotation. A second user provides a request that is received (block 705) to view the multimedia program. The sketch annotation is coded (block 706) to distinguish it from sketch annotations of other users. The second user is provided access (block 707) to the sketch annotation in conjunction with the second user receiving the multimedia program. The second user is presented (block 709) with visually detectable information indicative of the sketch annotation. In some embodiments, the second user is presented with an indication of the chronological location of the sketch annotation within the multimedia program. The second user is permitted (block 711) to navigate the multimedia content based on the sketch annotation. For example, by selecting the indication of the sketch annotation that is presented on a graphical timeline toward the end of the timeline, the user may navigate to the sketch annotation and toward the end of the program. Specifically, the user would be directed toward the frame or frames upon which the sketch annotation was made. A sketch annotation author may be enabled to specify sketch annotation criteria (e.g., define the makeup, location, and bounds of the sketch annotation) using a remote control and a graphical interface presented on a display screen.

Figure 8:
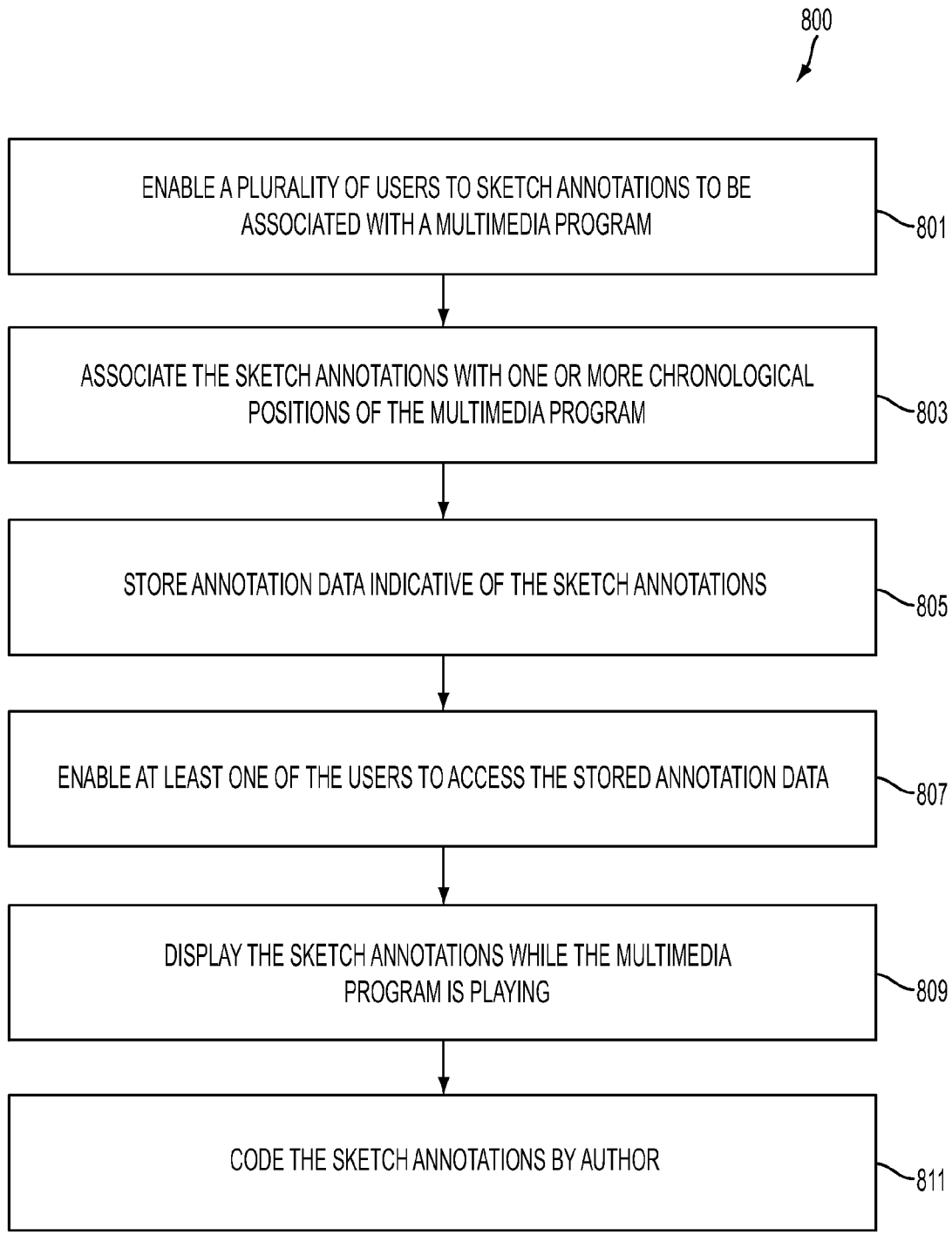
FIG. 8 is a flow diagram of selected elements of another embodiment of a sketch annotation method.

FIG. 8 illustrates a method or service that promotes social networking by allowing users to share sketch annotations with others that view multimedia programs. The depicted embodiment of collaborative sketch annotation method 800 includes enabling (block 801) a plurality of users to sketch annotations to be associated with a multimedia program. The sketch annotations are associated (block 803) with one or more chronological positions of the multimedia program. Sketch annotation data indicative of the sketch annotations is stored (block 805) and at least one user is enabled (block 807) to access the stored sketch annotation data. Sketch annotations are displayed (block 809) while the multimedia program is playing. Sketch annotations are coded (block 811) by author so that users can determine the source of a sketch annotation.

Embodied systems, methods, and services may enable a first user to create a sketch annotation while a second user is viewing the program. In such cases, a graphical interface presented to the second user may be dynamically updated to include timely indications of sketch annotations provided by other users in a collaboration group, for example. A sketch annotation author may initiate a sketch annotation mode by asserting (e.g., depressing) a sketch annotation button on a remote control device while the author is viewing the program. In response, disclosed systems may pause the display of the multimedia program for the author and allow the author to navigate to previous or future frames to choose frames on which to add sketch annotations. In some embodiments, the author is presented an option for setting a predetermined duration for presenting the sketch annotation to other users. Accordingly, sketch annotations are removed from displaying after the specified duration. Embodied systems may associate each sketch annotation with distinct features (e.g., colors, avatars, icons, textual identifiers) to allow users to determine the source of the sketch annotation.

There are many options for permitting sketch annotation authors to provide data used to create sketch annotations and sketch annotation data. For example, an author may create a sketch annotation by providing user input to a mobile communication device communicatively coupled to a first client (e.g. an STB). The mobile communication device (e.g., a cellular telephone) may be communicatively coupled over a wireless telephone network, a local WiFi connection, a Bluetooth connection, a wired connection, an infrared connection, a radio frequency connection, and the like. The mobile communication device may receive user input using a touch screen (with or without a stylus). Accordingly, creating sketch annotations may include a user creating a trace of a movement with a hardware element in the user's hand. For example, a user may wave his or her hand in a tight circle to create a small sketched circle on the display of the multimedia program. Accelerometers or other motion sensors within the remote control device may be used to effectively draw sketch annotations on a display. In some embodiments, a video camera may be set up to communicate with a first client device (e.g., an STB) to estimate user movements intended to create sketch annotations. If the first client is configured to detect hand movement from a video camera, the first client and associated processors may be aided by a sketch author wearing a special colored glove or finger sleeve (i.e., a glove that covers one finger) that is more easily detected by the video camera.

In some embodiments, sketch annotations are aligned to elements of a current image of the program. For example, if a first user is watching a football game and would like to emphasize or point out his or her favorite player to a second user, the first user may sketch a circle around the favorite player. Some embodied systems may automatically track the favorite player as the favorite player moves about the display during football action. In some embodiments, the sketch annotation may be removed from display if the sketch annotation no longer aligns to the program image, for example if the football player is no longer shown on the display. The sketch annotations made in accordance with disclosed embodiments may be chronologically ordered and a chronological "position" of a sketch annotation within a program may indicate, with a degree of precision that is implementation specific, a portion of the program that was being watched when the sketch annotation was created. For example, a timestamp may be applied to or associated with a sketch annotation or an indication of the sketch annotation.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the claimed subject matter is to be determined by the broadest permissible interpretation of the following claims and their equivalents, and shall not be restricted or limited by the foregoing detailed description.

What is claimed is:

1. A content annotation method, comprising:
receiving, from a first client associated with a first viewer viewing multimedia content selected from television content, pay-per-view content, and video on demand content, a first user input indicative of a first annotation including an image and a second user input indicative of a first annotation duration wherein annotations of the first viewer include source identification features indicative of the first viewer as a source of the annotations;
wherein the source identification features are selected from: a source identification avatar and a source identification icon;
associating the first annotation with a first temporal location of the multimedia content;
providing, by a data processing system, the multimedia content, the first annotation, and the first temporal location to a second client associated with a second viewer of the multimedia content, wherein, upon displaying the multimedia content, the second client displays the first annotation at the first temporal location, for the first annotation duration, overlaying the multimedia content; and
responsive to receiving a second annotation, a second temporal location, and a second annotation duration from the second viewer, the first client, upon displaying the multimedia content, displays the second annotation at the second temporal location, for the second annotation duration, overlaying the multimedia content.

2. The method of claim 1, wherein:
associating the first annotation with the first temporal location includes storing chronological information indicative of the first temporal location within the multimedia content.

3. The method of claim 1, wherein the first annotation comprises an image of the multimedia content displaying at the time the first viewer asserted an annotation button or otherwise created the first annotation.

4. The method of claim 1, wherein:
the second client navigates to a segment of the multimedia content containing the sketch annotation responsive to detecting an indication of the sketch annotation.

5. The method of claim 1, wherein the user input comprises user assertion of an annotation button on a remote control device while the program is presented to the first user.

6. The method of claim 1, wherein the first annotation is color coded to further distinguish it from further annotations from sources.

7. The method of claim 1, wherein the first user input comprises user input to a cellular telephone communicatively coupled to the first client, wherein the first client is a set top box.

8. The method of claim 7, wherein the cellular telephone receives the first user input via a touch screen of the cellular telephone.

9. The method of claim 7, wherein the cellular telephone is enabled to receive the first user input via a stylus.

10. The method of claim 3, wherein elements of the first annotation align to elements of a current image of the multimedia content.

11. The method of claim 10, further comprising:
removing the first annotation when the first annotation no longer aligns to the image.

12. The method of claim 11, wherein:
removing the first annotation occurs in response to a change of scene in the multimedia content.

13. The method of claim 7, wherein the first annotation data includes textual information to further distinguish annotations of other sources.

14. The method of claim 10, wherein the first annotation emphasizes a visible element of the multimedia content.

15. A data processing system suitable for use in a multimedia content delivery network, the system comprising:
a processor;
a computer readable storage medium including program instructions which, when executed by a processor, cause the processor to perform operations for annotating multimedia content, the operations comprising:
generating an annotation, including an image, based on viewer input wherein annotations of a first viewer include source identification features indicative of the first viewer as a source of the annotations, wherein the annotation features are selected from: a source identification avatar and a source identification icon;
associating the annotation with:
a temporal location of the multimedia content; and
a duration setting indicating an annotation duration;
storing data indicative of the annotation, the temporal location, and the annotation duration responsive to detecting an annotation request from a first client associated with a first viewer viewing the multimedia content, wherein the annotation is indicative of a path of motion of a hardware element affected by body movement of the first viewer;
recognizing a second viewer as a member of a collaboration group; and
providing the annotation and the temporal location to a second client associated with the second viewer in conjunction with the second viewer receiving the content wherein the second viewer views the annotation overlaying the multimedia content, for the annotation duration, during presentation of the multimedia content by the second client associated with the second viewer.

16. The system of claim 15, wherein the temporal location includes chronological information indicative of a chronological location within the multimedia content of the annotation.

17. The system of claim 15, wherein the annotation is color coded to further distinguish it from annotations from other sources.

18. The system of claim 16, wherein the first viewer input is provided to a mobile communication device.

19. The system of claim 18, wherein generating the annotation includes receiving viewer input from a touch screen coupled to the mobile communication device.

20. The system of claim 18, wherein the mobile communication device is a smart phone.

21. A content annotation method, comprising:
responsive to detecting viewer input indicating an annotation duration and including annotation input representing of an annotation, including an image, from a first viewer, the first viewer belonging to an annotation group, storing annotation data indicative of the annotation, wherein the annotation data is associated with a chronological location of multimedia content provided to the first viewer, wherein the multimedia content is selected from: television content, pay-per-view content, and video on demand content;
wherein annotations of the first viewer include source identification features indicative of the first viewer as a source of the annotations, wherein the annotation features are selected from: a source identification avatar and a source identification icon; and
responsive to a second viewer of the annotation group requesting the multimedia content, providing the annotation data and the multimedia content to the second viewer wherein, upon presentation to the second viewer, the annotation is displayed, overlaying the multimedia content, for a duration determined by the annotation duration.

22. The method of claim 21, wherein the annotation image is indicative of a frame of the multimedia content displayed when the first viewer annotated the multimedia content.

23. The method of claim 21, wherein the annotation includes chronological information indicative of a chronological location within the multimedia content of the annotation.

24. The method of claim 21, further comprising:
generating an annotation request responsive to the first viewer asserting an annotation button on a remote control device.

25. The method of claim 21, wherein the annotation is coded to further distinguish from annotations from other sources.

26. The method of claim 25, wherein the annotation includes textual annotations to further distinguish the annotation from annotations from other sources.

27. A collaborative sketch annotation method, comprising:
providing, by a first client, annotations, wherein each annotation includes a sketch image associated with a corresponding chronological position of a television program;
storing, by the first client, annotation data indicative of:
the annotations and the corresponding chronological positions; and
an annotation duration; and
sending the annotation data to a second client, wherein the second client, responsive to receiving the annotation data, asynchronously accesses the stored annotation data and displays the annotations overlaying the multimedia content for the annotation duration while receiving the television program;
wherein annotations of the first client include source identification features indicative of the first client as a source of the annotations, wherein the annotation features are selected from: a source identification avatar and a source identification icon.

28. The method of claim 27, further comprising defining a plurality of users wherein the plurality of users includes the second client.

29. The method of claim 28, wherein the second client navigates the program by the annotations.

30. The method of claim 29, further comprising identifying a selected recipient as the second client.

* * * * *